(12) United States Patent
D'Amico et al.

(10) Patent No.: US 7,481,483 B2
(45) Date of Patent: *Jan. 27, 2009

(54) TUBE-STYLE TRUCK BODY

(75) Inventors: John A. D'Amico, Casper, WY (US); Dennis A. Frank, Whitefish, MT (US)

(73) Assignee: Mine Rite Technologies, LLC, Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/277,941

(22) Filed: Mar. 29, 2006

(65) Prior Publication Data

US 2007/0069569 A1  Mar. 29, 2007

Related U.S. Application Data

(63) Continuation-in-part of application No. 11/214,129, filed on Aug. 29, 2005, now Pat. No. 7,207,621.

(51) Int. Cl.
*B62D 33/00* (2006.01)
(52) U.S. Cl. .................. 296/183.1; 296/183.2
(58) Field of Classification Search .............. 296/183.1, 296/183.2, 186.1
See application file for complete search history.

(56) References Cited

U.S. PATENT DOCUMENTS

| | | | | | |
|---|---|---|---|---|---|
| 2,767,867 | A | * | 10/1956 | Wood | 414/525.5 |
| 2,910,322 | A | * | 10/1959 | Magor | 296/183.1 |
| 3,134,628 | A | * | 5/1964 | Lackey et al. | 298/21 R |
| 3,208,790 | A | | 9/1965 | Domes | |
| 3,247,985 | A | * | 4/1966 | Scardoni | 414/515 |
| 3,363,933 | A | * | 1/1968 | Wilson | 296/183.2 |
| 3,463,471 | A | * | 8/1969 | Reid | 266/165 |
| 3,472,548 | A | * | 10/1969 | Comisac | 296/183.2 |
| 3,480,321 | A | | 11/1969 | Brandt et al. | |
| D217,726 | S | | 6/1970 | Cohn | |
| D235,528 | S | | 6/1975 | Ahola | |
| 3,905,493 | A | * | 9/1975 | Logue | 296/56 |
| 3,923,337 | A | * | 12/1975 | Kershaw et al. | 296/183.2 |
| 4,162,096 | A | * | 7/1979 | Proeschl | 296/193.04 |
| 4,230,360 | A | | 10/1980 | Eisenman | |
| 4,474,404 | A | | 10/1984 | Hagenbuch | |
| 4,624,619 | A | * | 11/1986 | Uher | 296/61 |
| 4,678,235 | A | * | 7/1987 | Hagenbuch | 296/183.2 |
| 4,826,233 | A | | 5/1989 | Hagenbuch | |
| 4,831,539 | A | * | 5/1989 | Hagenbuch | 701/207 |
| 4,839,835 | A | * | 6/1989 | Hagenbuch | 702/174 |
| 4,845,648 | A | * | 7/1989 | Hagenbuch | 702/174 |
| 5,158,340 | A | * | 10/1992 | Boda | 298/23 M |
| 5,174,632 | A | * | 12/1992 | Hagenbuch et al. | 296/183.2 |
| 5,249,843 | A | * | 10/1993 | Hagenbuch et al. | 298/23 DF |

(Continued)

*Primary Examiner*—Kiran B. Patel
(74) *Attorney, Agent, or Firm*—Antoinette M. Tease, P.L.L.C.

(57) ABSTRACT

An off-highway truck body comprising a plurality of tube-style support members, wherein each tube-style support member comprises one or two pieces of square tubing, wherein the truck body comprises two sidewalls, a floor, a front wall and a canopy, and wherein one side of each tube-style support member is welded to the outside of the sidewall, floor, front wall or canopy. The pieces of square tubing are preferably comprised of steel. The present invention optionally comprises a forward wedged front wall and a side-sloped canopy. The present invention also encompasses a tube-style tailgate and an alternate embodiment in which I-beams are used in lieu of square tubing.

2 Claims, 14 Drawing Sheets

U.S. PATENT DOCUMENTS

| | | | |
|---|---|---|---|
| 5,425,564 A * | 6/1995 | Thayer | 296/61 |
| 5,460,431 A * | 10/1995 | McWilliams | 298/22 AE |
| 5,597,174 A * | 1/1997 | Christenson et al. | 280/86.5 |
| 5,662,374 A * | 9/1997 | Wheeler | 296/183.2 |
| 5,700,047 A * | 12/1997 | Leitner et al. | 296/26.11 |
| 5,797,657 A * | 8/1998 | D'Amico et al. | 296/183.2 |
| 5,816,638 A * | 10/1998 | Pool, III | 296/26.11 |
| 6,076,693 A | 6/2000 | Reiter et al. | |
| 6,113,173 A * | 9/2000 | Leitner et al. | 296/26.11 |
| 6,142,548 A * | 11/2000 | Kuhn et al. | 296/26.1 |
| 6,257,637 B1 * | 7/2001 | Reed | 296/26.08 |
| 6,305,731 B1 | 10/2001 | Hook et al. | |
| D450,627 S * | 11/2001 | Musso et al. | D12/15 |
| 6,402,215 B1 * | 6/2002 | Leitner et al. | 296/26.11 |
| 6,422,627 B1 * | 7/2002 | Kuhn et al. | 296/26.1 |
| 6,478,176 B1 | 11/2002 | Reiter et al. | |
| 6,481,785 B1 * | 11/2002 | Coleman et al. | 296/183.2 |
| 6,485,004 B1 * | 11/2002 | Licata et al. | 296/57.1 |
| 6,520,590 B2 | 2/2003 | Feuereisen Azocar | |
| 6,565,146 B2 | 5/2003 | Fujan et al. | |
| 6,592,171 B1 | 7/2003 | Hinds | |
| 6,592,172 B2 * | 7/2003 | Fujan et al. | 296/183.2 |
| 6,805,392 B2 * | 10/2004 | Leitner et al. | 296/26.08 |
| 6,935,678 B1 * | 8/2005 | Laban et al. | 296/183.2 |
| 6,994,389 B1 * | 2/2006 | Graffy et al. | 296/26.11 |
| 7,025,407 B2 * | 4/2006 | Medel | 296/183.2 |
| 7,063,366 B2 * | 6/2006 | Leitner et al. | 296/26.11 |
| 7,100,256 B2 * | 9/2006 | D'Amico et al. | 296/183.2 |
| 7,240,940 B2 * | 7/2007 | Leitner | 296/26.11 |
| 2002/0180241 A1 | 12/2002 | Fujan et al. | |
| 2003/0160049 A1 | 8/2003 | Reiter et al. | |
| 2004/0026959 A1 | 2/2004 | Kostecki | |
| 2007/0068984 A1 * | 3/2007 | Leitner et al. | 224/402 |

* cited by examiner

PRIOR ART

TUBE-STYLE TRUCK BODY

CROSS-REFERENCE TO RELATED APPLICATION

This application is a continuation-in-part of U.S. patent application Ser. No. 11/214,129, filed on Aug. 29, 2005.

BACKGROUND OF THE INVENTION

1. Field of the Invention

The present invention relates to the field of off-highway truck bodies, and more particularly, to a tube-style truck body with a forward wedged front wall and side-sloped canopy.

2. Description of the Related Art

A traditionally built off-highway truck body is comprised of a plurality of bent steel ribs that form the skeletal structure or framework of the truck body, and solid steel plates overlying the ribs to form the truck box or container in which the material is held. The steel ribs are formed by bending flat sheets of steel and then welding them to the steel plates that form the truck box. These ribs are typically shaped like a "U" or a "V" with the open side of the "U" or "V" facing inward (attached to the steel plates).

The problem with bent steel ribs is that because they are open on one side, they do not tend to withstand the bending and twisting that accompanies the stress that is placed on the truck body during normal operations. One way to compensate for this stress is to increase the thickness of the steel used to form the bent ribs, which in turn increases the overall weight of the truck body. In addition, bent ribs are labor-intensive, which adds to the time required to manufacture the truck body. Because each rib is individually formed, there tends to be inconsistency in shape from one bent rib to another. It is also more difficult to achieve a solid weld with the bent ribs because of the inconsistency in the weld land.

Furthermore, due to current size restrictions in the press brakes that are used to form the bent ribs, long structural pieces such as the floor ribs cannot be made from one piece of bent steel but rather are formed by more than one bent rib welded end-to-end. The joining of the ribs end-to-end for the longer structural pieces further diminishes the structural integrity of the truck body and requires added manufacturing.

Another problem addressed by the present invention is the problem of material accumulation in the front corners of the truck body, where the front wall meets the floor and sidewalls. In traditional truck bodies, there is a ninety (90)-degree angle between the line formed by the joinder of the sidewall and the floor and the line formed by the joinder of the floor and front wall (this is illustrated in FIG. 11 below). This ninety (90)-degree angle can cause material, particularly highly cohesive material, to accumulate in the front corners of the truck body. This accumulation of material not only reduces the volume capacity of the truck body, but it also adds weight to the truck body when it is empty.

The present invention also addresses the problem of material retention on the canopy. With a traditional flat canopy, material tends to slough onto the canopy during loading. The retention of material on top of the canopy distorts the weight distribution of the vehicle by placing additional weight on the front axle. Flat canopies also cause side spill, as material falls from the canopy during travel. This occurrence leads to tire abuse and increased maintenance required on roads.

U.S. Pat. No. 6,520,590 (Feuereisen Azocar, 2003) attempts to alleviate some of the problems discussed above by providing a truck body with a front wall and floor that are elliptical in shape. This design reduces the number of beams (or bent ribs) that are required to support the truck box, thereby the overall weight of the truck body. Thus, the payload can be increased without exceeding the maximum gross weight allowed. According to the inventors, this design is less expensive to manufacture than the traditional truck body because fewer beams are required. The curved shape of the truck body avoids the concentration of strains that would otherwise damage the truck body, and it increases the discharge speeds of materials due to the non-existence of encounters with angles. Although attempting to address many of the same problems inherent in traditional truck bodies, the '590 patent does so in a manner very different than the present invention.

U.S. Pat. No. 6,565,1476 and (Fujan et al., 2003) U.S. Patent Application Pub. No. 2002/0180241 (Fujan) provide another off-highway truck body with a curved floor, curved front wall, curved sidewalls and curved cab protector (or canopy). According to the inventors, the steel ribs that are used to buttress the flat steel plates that form the truck body are costly and labor-intensive to fabricate and weld in place, the resulting connections are subject to fatigue, and the ribs increase the weight the truck body, thereby lowering the hauling capacity of the vehicle. Rather than developing a better rib, the inventors attempted to reduce or eliminate the need for ribs by providing a truck body that is entirely curved. Unlike the present invention, the canopy is curved upward, which would tend to retain material, rather than curved or angled downward, which would cause material to fall off of the canopy.

U.S. Patent Application Pub. No. 2004/0026959 (Kostecki) attempts to alleviate the problem associated with material build-up in the front corners of the truck body by providing removable wear plates that are installed between one or more of the front wall, side walls and floor.

U.S. Pat. No. 3,208,790 (Domes, 1965) attempts to solve the problems associated with using traditional U-shaped members (or bent ribs) to form the top rails of truck bodies. This invention provides a semi-circular top rail that curves down and over the outside of the sidewall and then is welded to the sidewall. One of the goals of this invention was to provide a curved surface that would resist any downward load applied to the top rail. Other goals were to decrease the number of parts required to build the top rail and to prevent the loader or shovel from inadvertently engaging the top rail during loading operations.

U.S. Pat. No. 6,481,785 (Coleman et al., 2002) describes a truck body design in which the junction between the floor and the upright panel (or front wall) is arcuate to facilitate the flow of materials being delivered into the dump body during the loading of the body (in other words, to direct the materials toward the floor).

U.S. Pat. No. 6,592,171 (Hinds, 2003) describes a way of bolstering the welded connection between the longitudinal and lateral ribs of a traditionally built truck body. In this invention, the ribs have a substantially U-shaped cross-section (as described above), which is particularly susceptible to the stresses associated with loading and unloading. Over time, these stresses can weaken the welds between the longitudinal and lateral ribs, causing those joints to crack. The invention covered by the '171 patent is a particular type of weld joint that is intended to strengthen the connection between the longitudinal and lateral ribs.

BRIEF SUMMARY OF THE INVENTION

The present invention is an off-highway truck body comprising a plurality of tube-style support members, wherein each tube-style support member comprises one or two pieces of square tubing, wherein the truck body comprises two sidewalls, a floor, a front wall and a canopy, and wherein one side of each tube-style support member is welded to the outside of the sidewall, floor, front wall or canopy. The pieces of square tubing are preferably comprised of steel. Each tube-style support member that comprises two pieces of square tubing further comprises a cover plate that extends across the top side of the two pieces of square tubing for the length of the square tubing.

The off-highway truck body of the present invention optionally comprises a forward wedged front wall, wherein the front wall is wedged forward such that the angle between the line formed by the juncture of the sidewall and floor and the line formed by the juncture of the forward wedged front wall and floor is greater than ninety (90) degrees and less than one hundred eighty (180) degrees. In an alternate embodiment, the top approximate one-third (⅓) of the front wall is tilted further forward (i.e., at a greater angle) than the rest of the front wall.

The off-highway truck body of the present invention optionally comprises a side-sloped canopy, wherein the side-sloped canopy comprises two sides that are angled downward and a center section that is flat. In an alternate embodiment, the side-sloped canopy comprises a peaked center and four sloped sides, wherein two of the sloped sides are on either side of the peaked center, wherein all of the sloped sides are angled downward, and wherein the two sloped sides farthest from the peaked center are sloped at a greater angle than the two sloped sides closest to the peaked center.

The present invention optionally includes a tube-style tailgate, which can be used with a tube-style truck body or with a conventional truck body.

In an alternate embodiment, the truck body of the present invention is comprised of steel I-beams in lieu of square steel tubing. This embodiment provides many of the same advantages as the tube-style truck body.

REFERENCE NUMBERS

Figure 1:
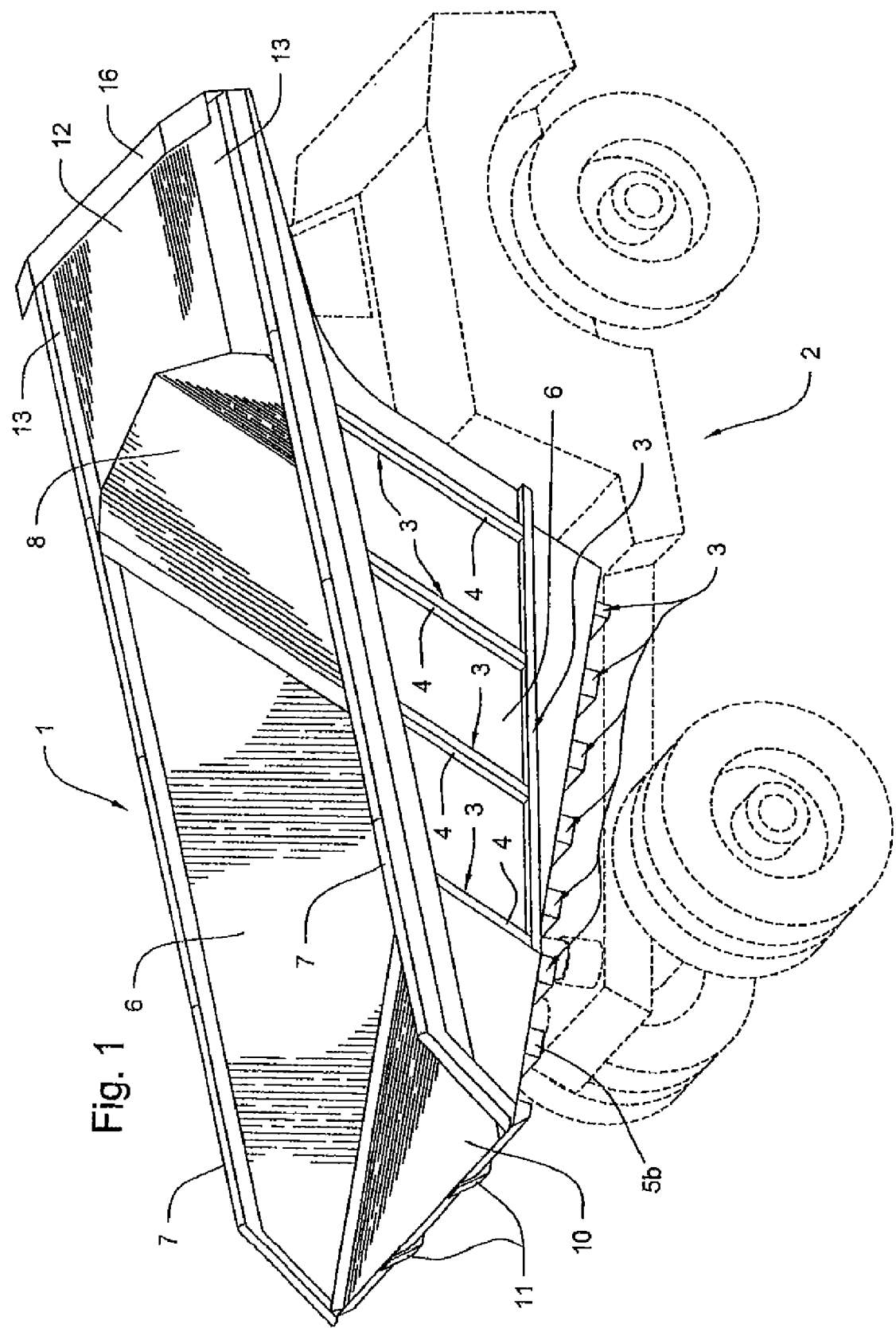
FIG. 1 is a perspective view of the truck body of the present invention installed on a chassis.

1 Truck body
2 Chassis
3 Tube-style support member
4 Square tubing
5a Cover plate
5b End plate
6 Sidewall
7 Top rail cap
8 Forward wedged front wall
9 Flat front wall
10 Floor
11 Floor rail assembly
12 Side-sloped canopy
13 Sloped side of canopy
14 Peaked center of canopy
15 Flat canopy
16 Spill guard
17 Bent rib
18 Tilted portion of front wall
19 Lift cylinder brackets
20 Tailgate
21 Rear panel of tailgate
22 Side panel of tailgate
23 I-beam
24 I-beam-style support member

DETAILED DESCRIPTION OF INVENTION

FIG. 1 is a perspective view of the truck body of the present invention installed on a chassis. This figure shows the truck body 1 and the chassis 2. The truck body 1 comprises a plurality of tube-style support members 3. Each tube-style support member 3 is comprised of one or two pieces of square tubing 4. The former is referred to as a single-size tube-style support member, and the latter is referred to as a double-size tube-style support member. If two pieces of square tubing 4 are used to form one tube-style support member 3, then a cover plate 5a (shown in FIG. 2) is welded onto the top of both pieces of square tubing 4 to give them the strength and appearance of a single structure.

The number and configuration (i.e., combination of single- and double-size tube-style support members) will vary depending on the size and strength requirement of the truck body based on the particular application involved. The present invention is not limited to any particular number or configuration of tube-style support members. The square tubing 4 is preferably made of steel. As shown more clearly in FIG. 2, the truck body 1 optionally comprises a forward wedged front wall 8 and a side-sloped canopy 12.

Figure 2:
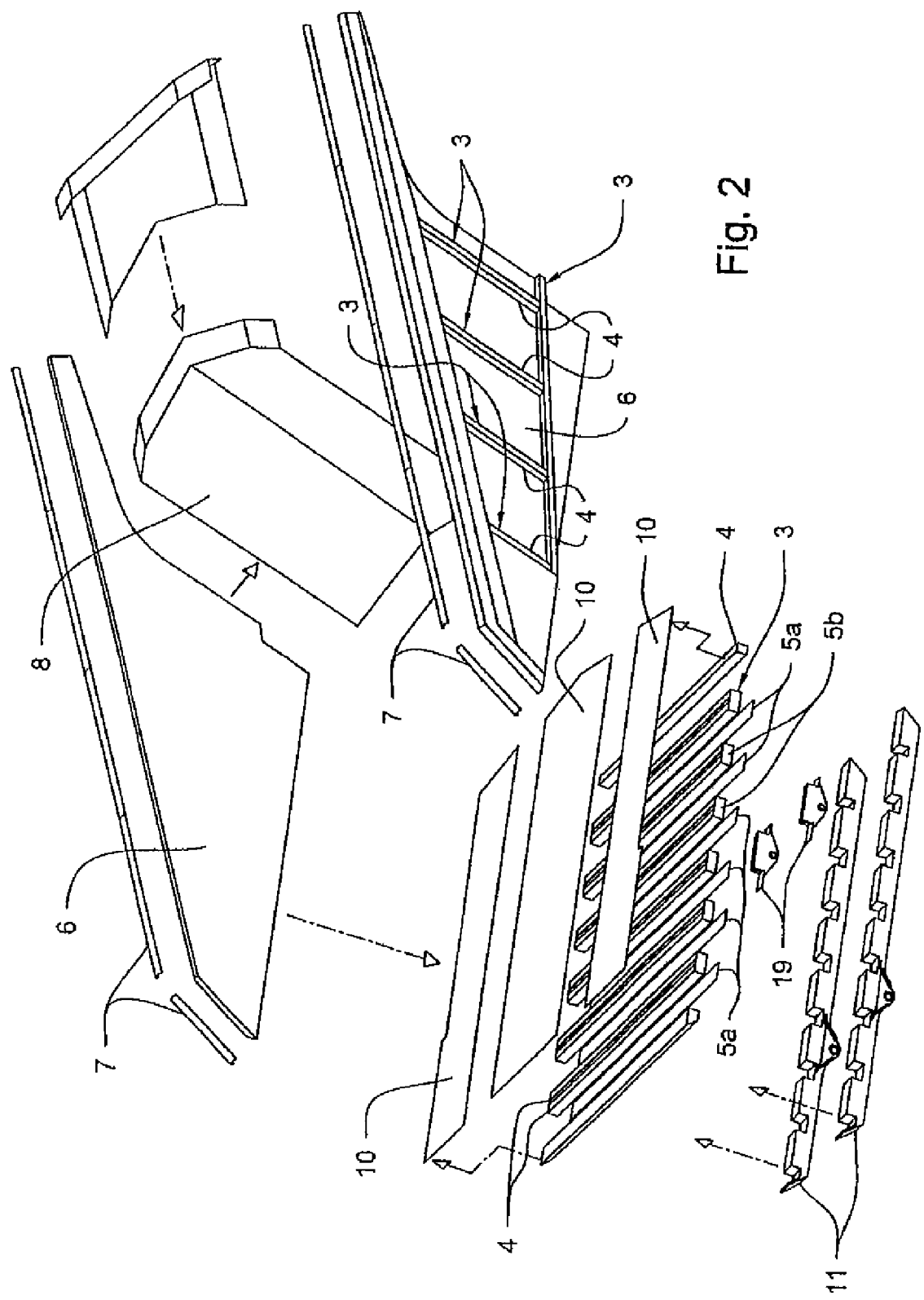
FIG. 2 is an exploded view of the truck body of the present invention taken from a right rear perspective.

FIG. 2 is an exploded view of the truck body of the present invention taken from a right rear perspective. This figure shows the forward wedged front wall 8 and side-sloped canopy 12, as well as the tube-style support members 3. The tube-style support members 3 optionally comprise end plates 5b that prevent dirt and debris from lodging inside the pieces of square tubing 4. The sidewalls 6, floor 10, and floor rail assembly 11 are also shown. Although not part of the present invention, the sidewalls 6 may be capped with a top rail cap 7. The truck body 1 is attached to the chassis (not shown) by the floor rail assembly 11. The canopy optionally includes a spill guard 16, which prevents material from spilling over the front of the truck. This figure also shows the lift cylinder brackets 19, which are not germane to the present invention but are shown for accuracy.

The side-sloped canopy 12 comprises two sloped sides 13, which ensure that no material is retained on the sides of the canopy. The retention of material on top of the canopy, which occurs with traditional flat canopies (see FIG. 10), leads to an inaccurate calculation of the payload and places weight on the front axle that is not taken into account by the manufacturer in determining the optimum axle splits. Over time, this occurrence can lead to undue strain on the front axle.

The forward wedged front wall allows for a more accurate calculation of the vehicle's payload because material that might otherwise accumulate on the canopy is included in the material envelope created by the truck body. With the side-sloped canopy 12 and forward wedged front wall 8, material that might accumulate on the canopy is sloughed off in the loading area, which is usually consistently maintained, or directed downward into the truck body 1. In traditional truck bodies with a flat front wall and flat canopy (see FIG. 10), material that sloughs onto the canopy during the loading process is often shed on the haul road, which can lead to both increased road maintenance and tire damage.

In addition to directing material off of the rear of the canopy, the forward wedged front wall also prevents material from accumulating in the front corners of the truck body. As noted above, in traditional truck bodies, material tends to accumulate in the front corners of the truck body because there is a ninety (90)-degree angle between the line formed by the joinder of the floor and sidewall and the line formed by the joinder of the floor and front wall (see FIG. 11). When this angle is opened up, as with a forward wedged front wall, it is more difficult for material to bridge the wider angle, and there is less material accumulation. The accumulation of material in the front corners of the truck body decreases the production capacity of the vehicle and eventually requires additional cleaning.

Figure 3:
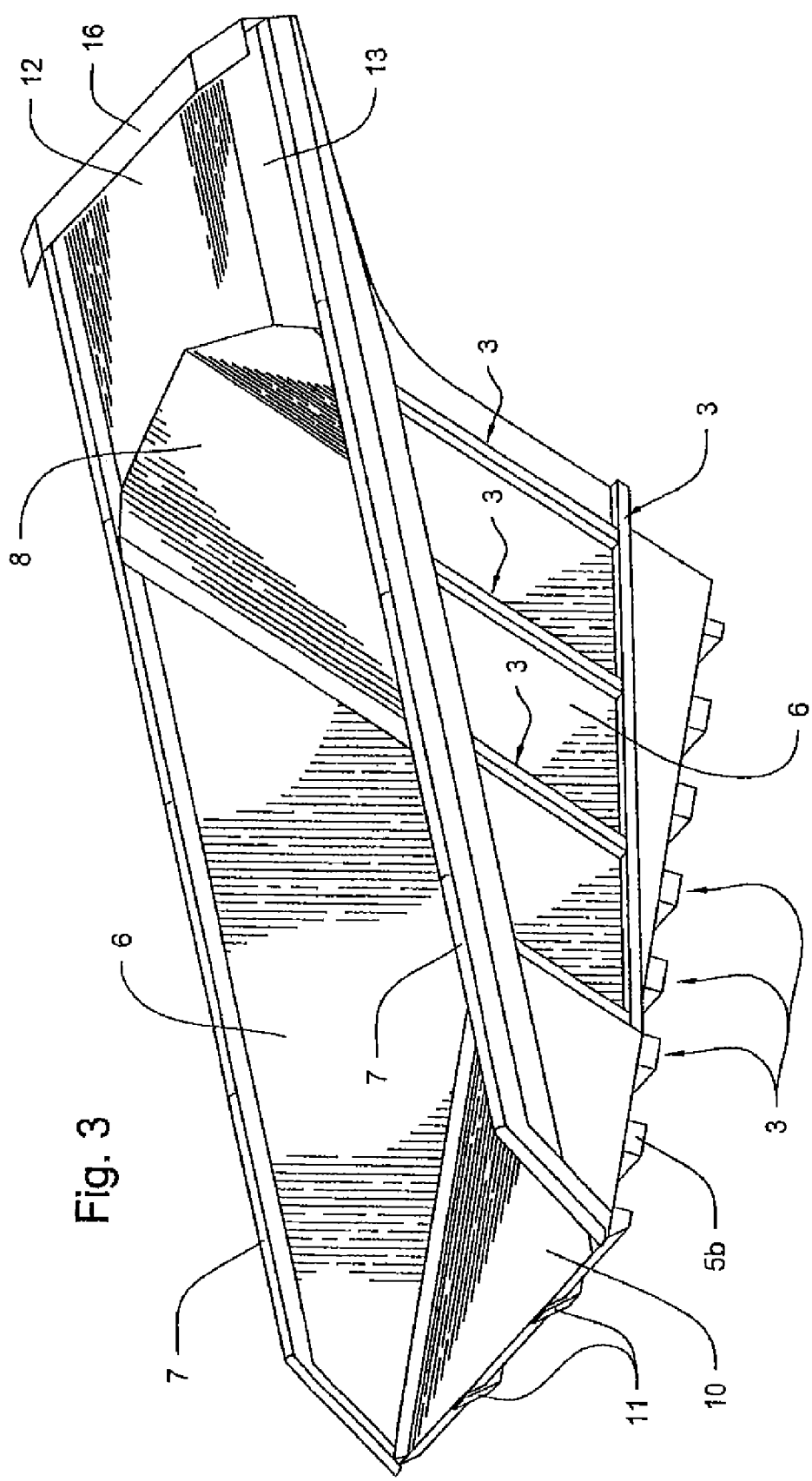
FIG. 3 is a right rear perspective view of the truck body of the present invention.

FIG. 3 is a right rear perspective view of the truck body of the present invention. FIG. 3 is the same as FIG. 2, except that the various parts of the truck body are assembled.

Figure 4:
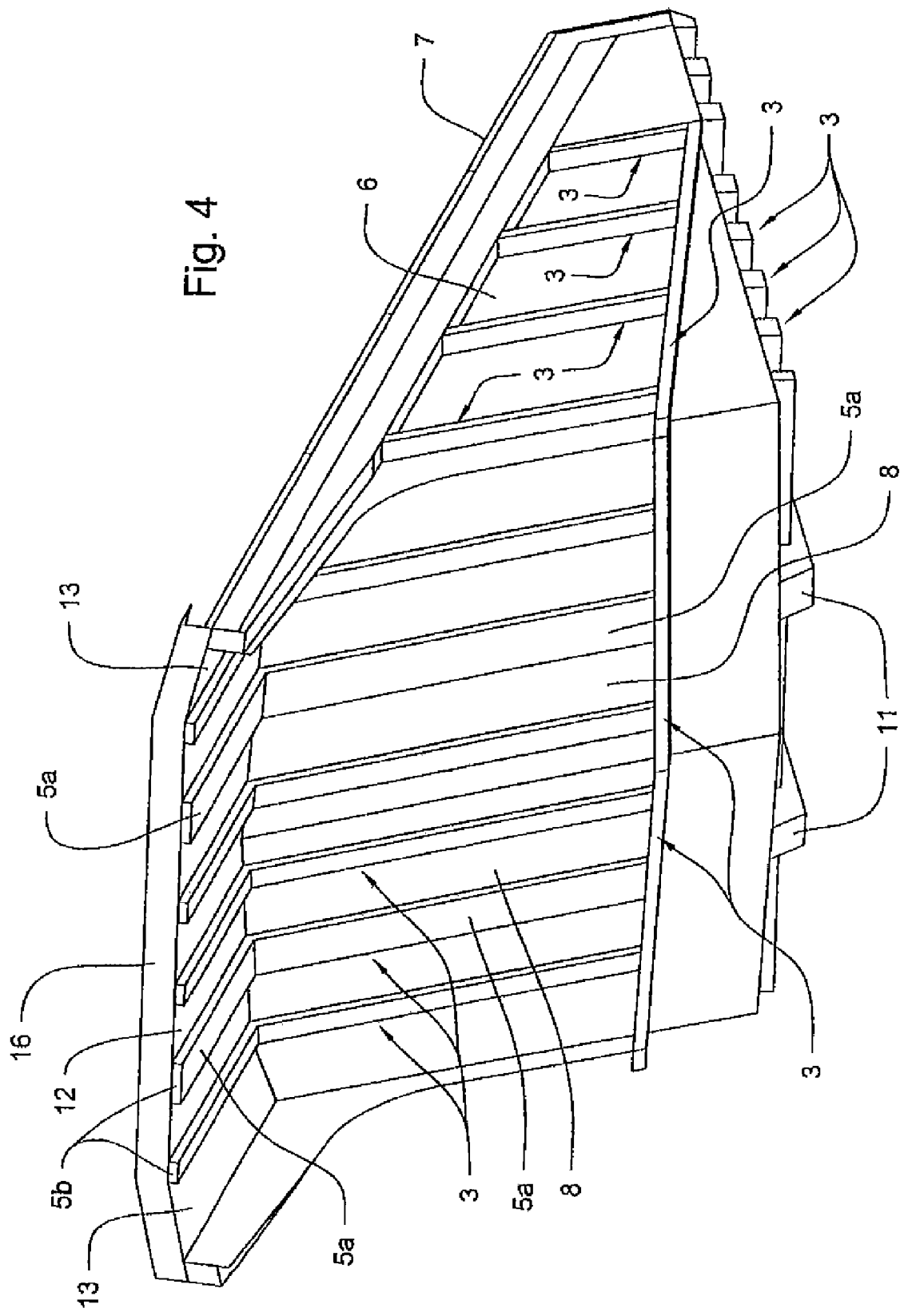
FIG. 4 is a left front perspective view of the truck body of the present invention.

FIG. 4 is a left front perspective view of the truck body of the present invention. This figure shows the forward wedged front wall 8, the side-sloped canopy 12 and spill guard 16, and the tube-style support members 3. It also shows the left sidewall 6, and the floor rail assembly 11.

Figure 5:
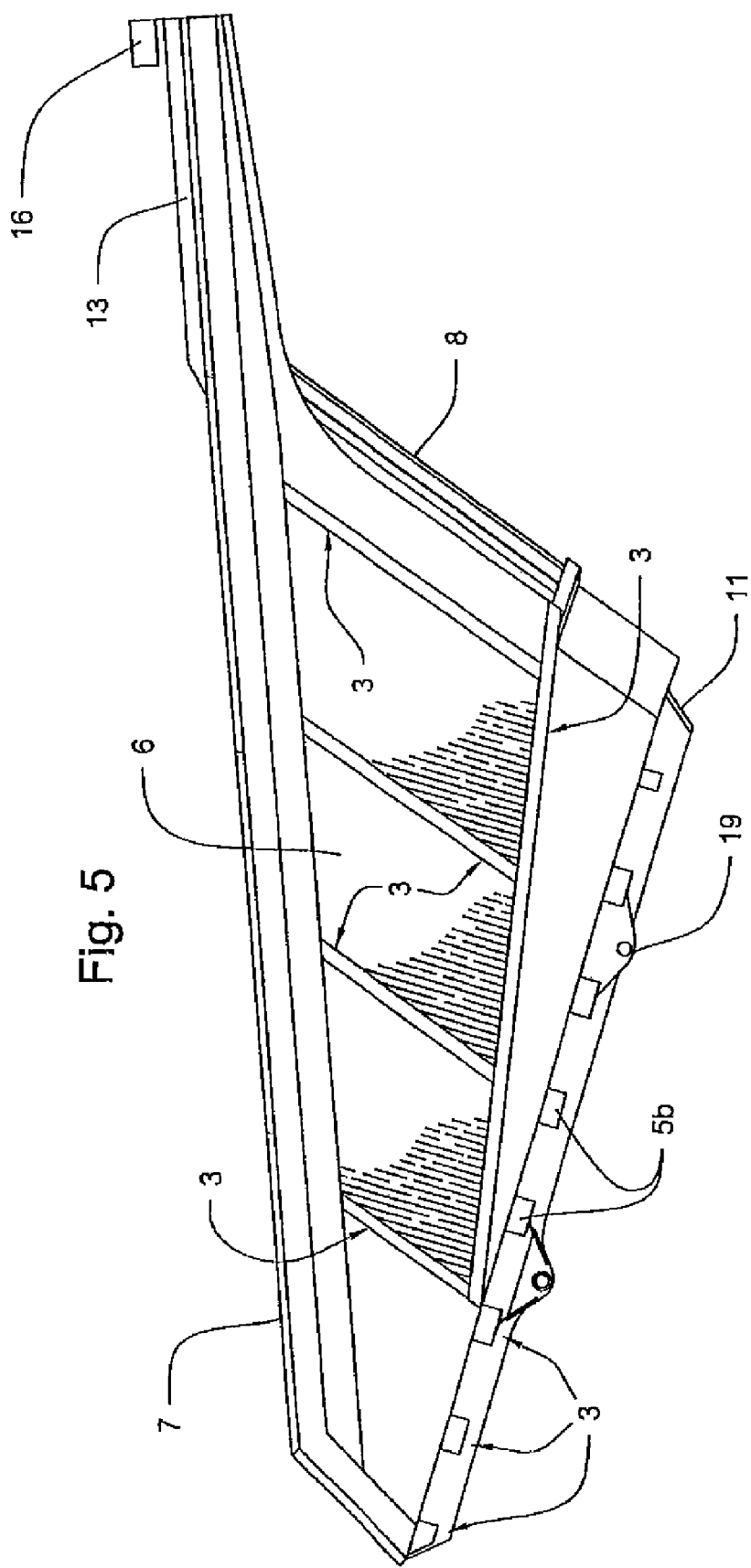
FIG. 5 is a right side view of the truck body of the present invention.

FIG. 5 is a right side view of the truck body of the present invention. This figure shows the forward wedged front wall 8, the sidewall 6, and one of the sloped sides 13 of the side-sloped canopy. It also shows the tube-style support members 3 on the outside of the sidewall 6 and underneath the floor 10 (floor not shown, but tube-style support members underneath the floor are shown). In the present invention, the tube-style support members are used on the outside of the sidewalls and front wall and underneath the floor and canopy.

Figure 6:
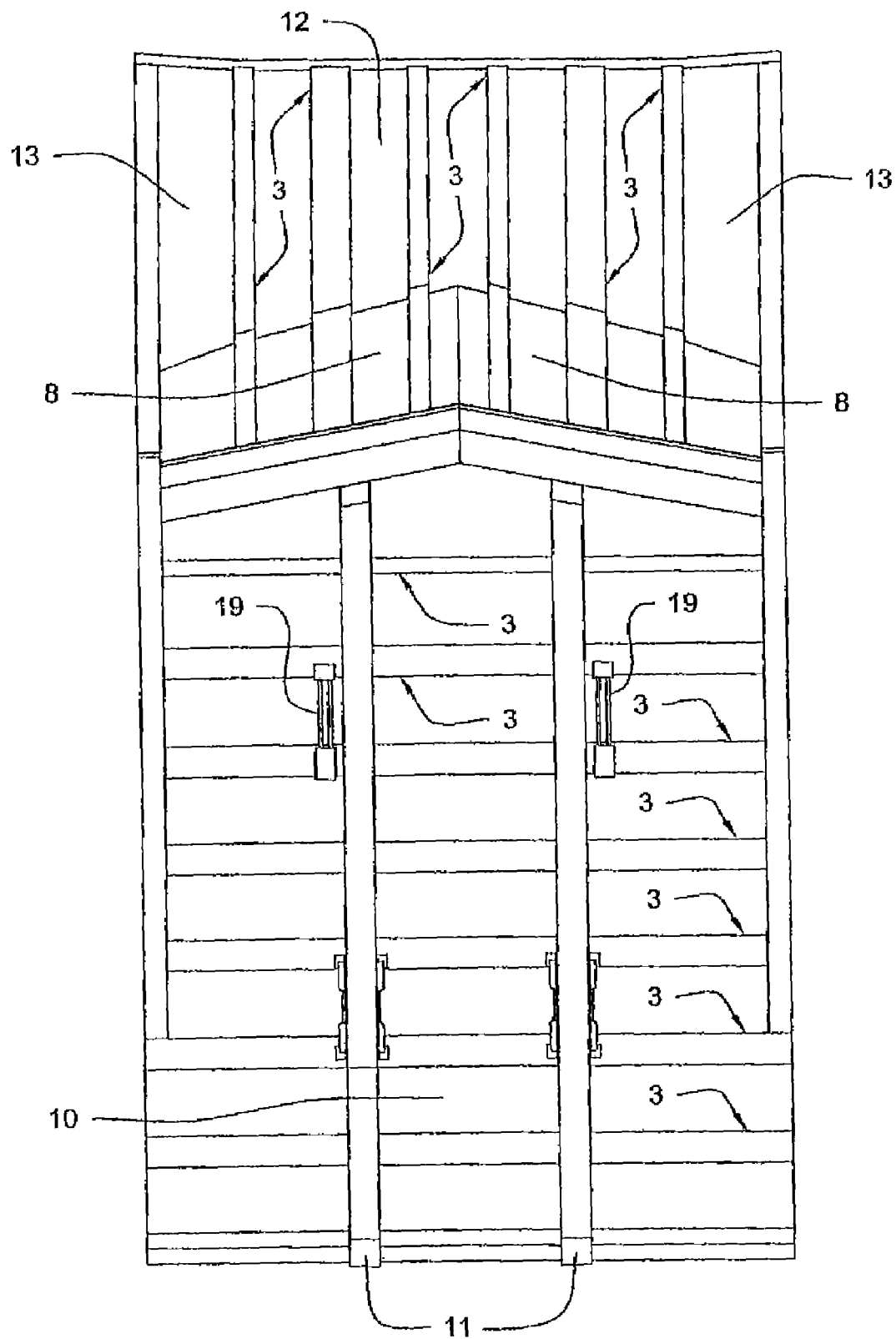
FIG. 6 is a bottom view of the truck body of the present invention.

FIG. 6 is a bottom view of the truck body of the present invention. This figure shows the tube-style support members 3 on the bottom of the truck body, as well as the tube-style support members on the outside of the front wall 8 and underneath the canopy 12. It also shows the floor rail assembly 11.

With the tube-style support members, a single piece of square tubing can be used to form one of the tube-style support members 3 that support the floor, whereas with the traditional bent rib design, due to the size limitations of the press brakes that are used to form the bent ribs, more than one bent rib has to be joined together end-to-end to form the floor rib.

Figure 7:
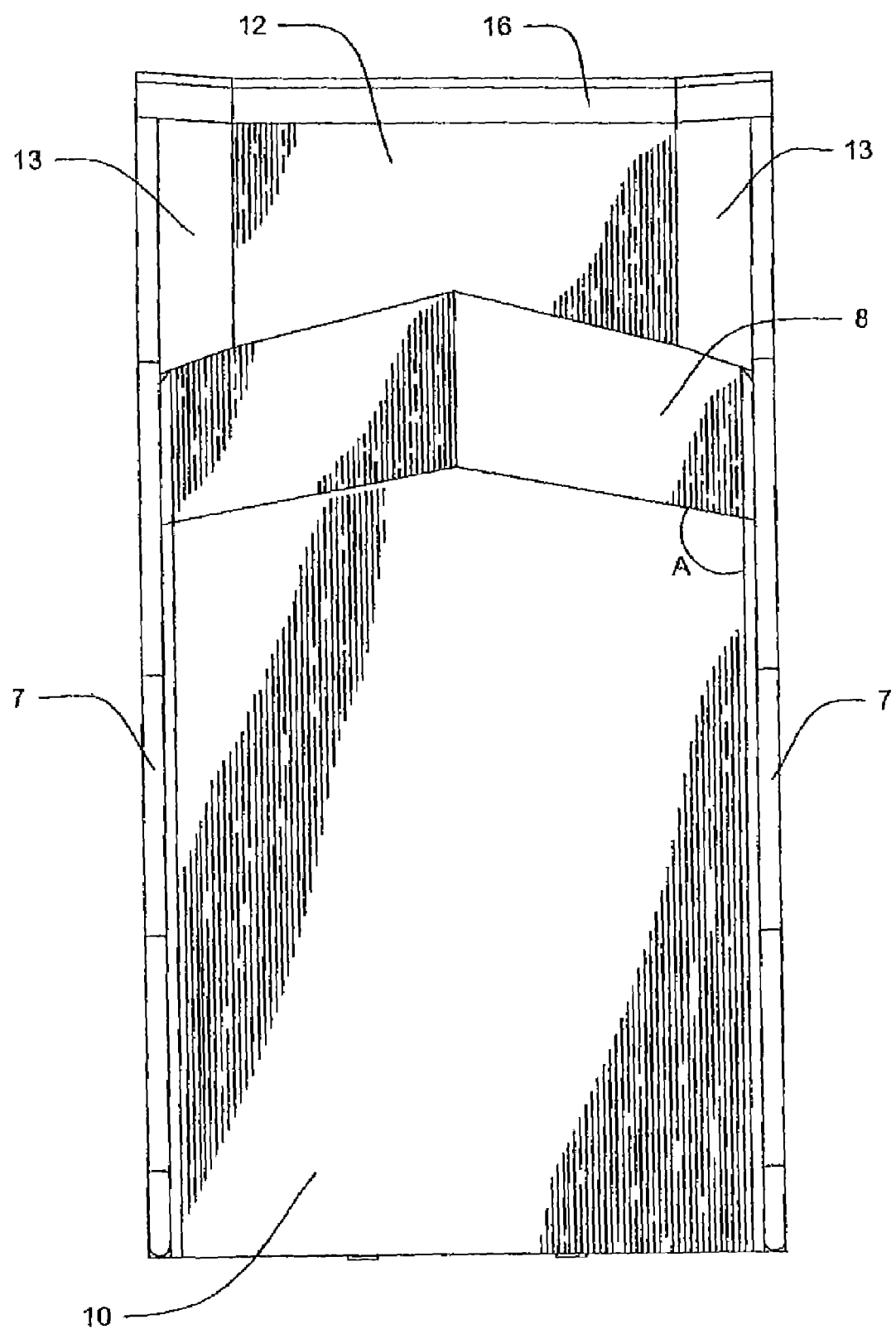
FIG. 7 is a top view of the truck body of the present invention.

FIG. 7 is a top view of the truck body of the present invention. This figure shows the floor 10' top rail cap 7, forward wedged front wall 8, side-sloped canopy 12, and spill guard 16. As shown in this figure, the angle between the line formed by the juncture of the sidewall 6 and floor 10, on the one hand, and the line formed by the juncture of the forward wedged front wall 8 and floor 10, on the other hand (shown in FIG. 7 as angle "A"), is greater than ninety (90) degrees. In this figure, the angle is approximately one hundred (100) degrees. The present invention is not limited to any particular angle, although the angle must be greater than ninety (90) degrees and less than one hundred eight (180) degrees.

Figure 8:
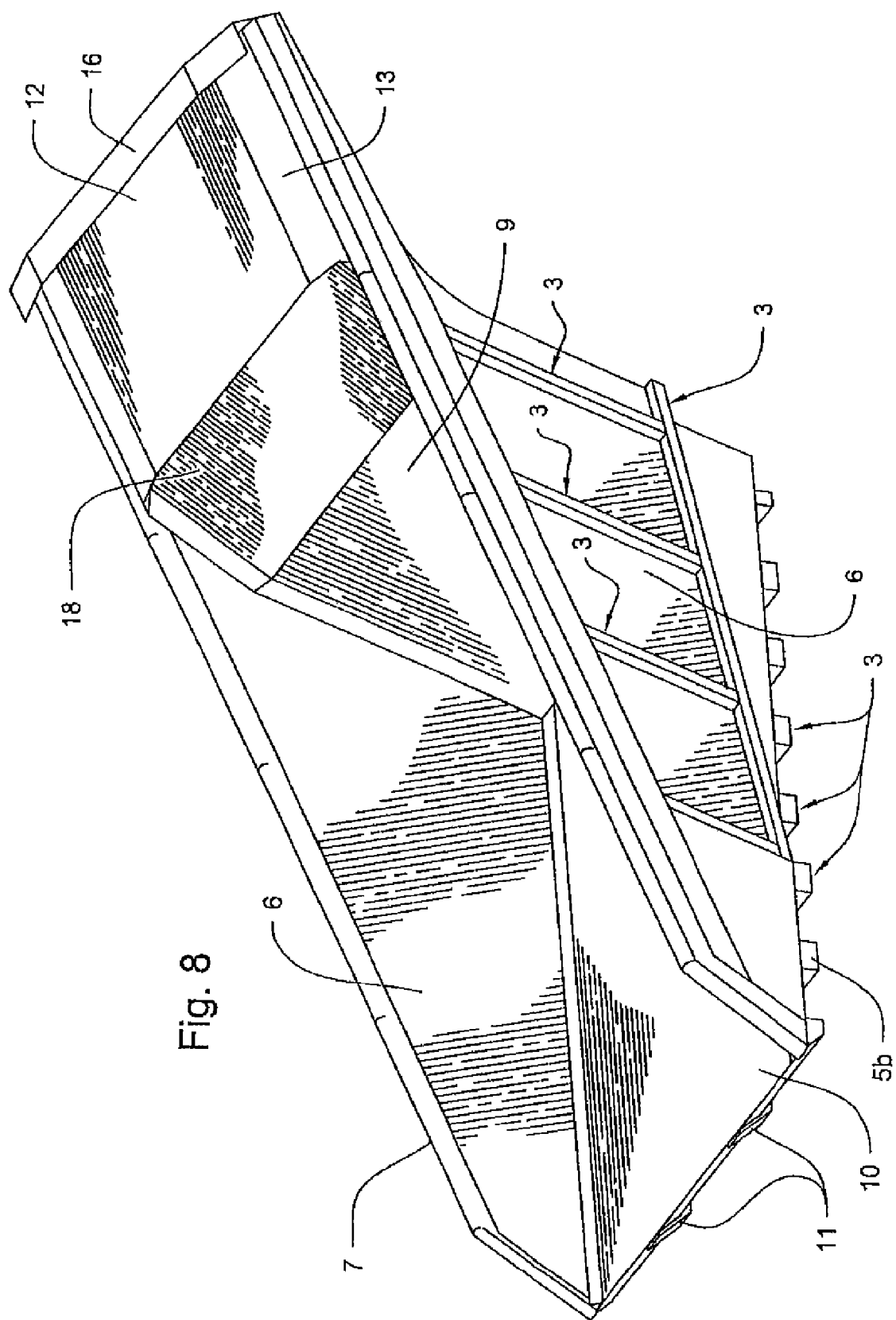
FIG. 8 is a right rear perspective view of the truck body of the present invention with an alternate embodiment of the front wall.

FIG. 8 is a right rear perspective view of the truck body of the present invention with an alternate embodiment of the front wall. In this embodiment, the top approximate one-third of the front wall 18 is tilted further forward (i.e., at a greater angle) than the rest of the front wall 9. This embodiment might be used when there are loading height restrictions that make it impractical to construct a fill forward wedged front wall because the height of the sidewalls is limited. The partial tilt embodiment shown here achieves the same purpose as the full forward wedged front wall because it includes in the material envelope of the truck body material that would otherwise remain on the rear end of the canopy.

Figure 9:
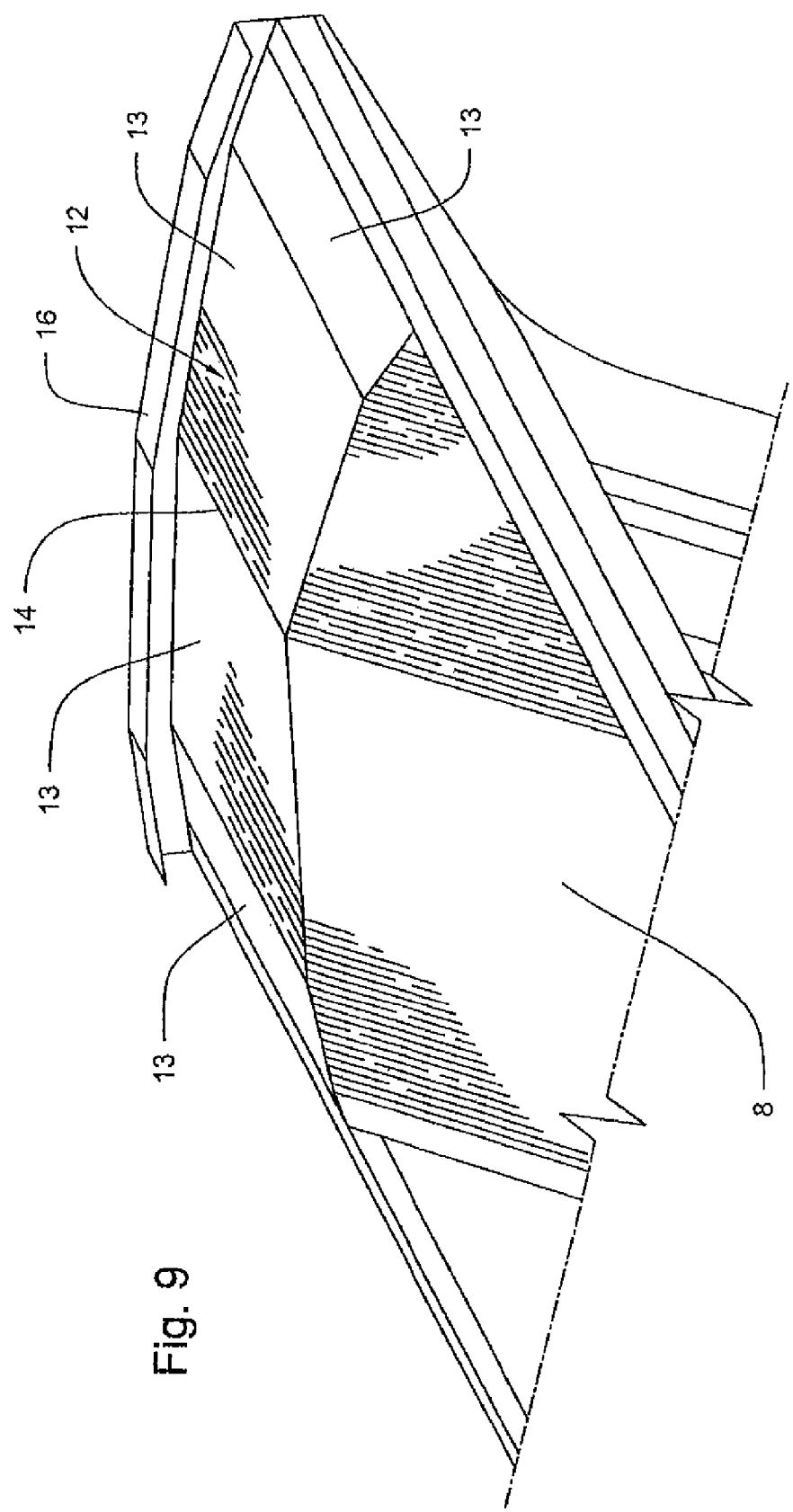
FIG. 9 is a perspective view of an alternate embodiment of the side-sloped canopy with a peaked center section.

FIG. 9 is a perspective view of an alternate embodiment of the side-sloped canopy with a peaked center section. In this embodiment, the center portion of the canopy is not flat, as shown in FIGS. 1-8. Instead, the canopy comprises a peaked center 14, which results in the canopy having four sloped sides 13. Preferably, the two sloped sides 13 that are farthest from the peaked center 14 are sloped at a greater angle (i.e., steeper) than the two sloped sides 13 that are closest to the peaked center 14. This configuration is particularly useful for more cohesive or sticky material, such as material that has a high clay content or that is oil-impregnated, or material that contains large rocks or boulders that might not fall off of a side-sloped canopy without the peaked center.

Figure 10:
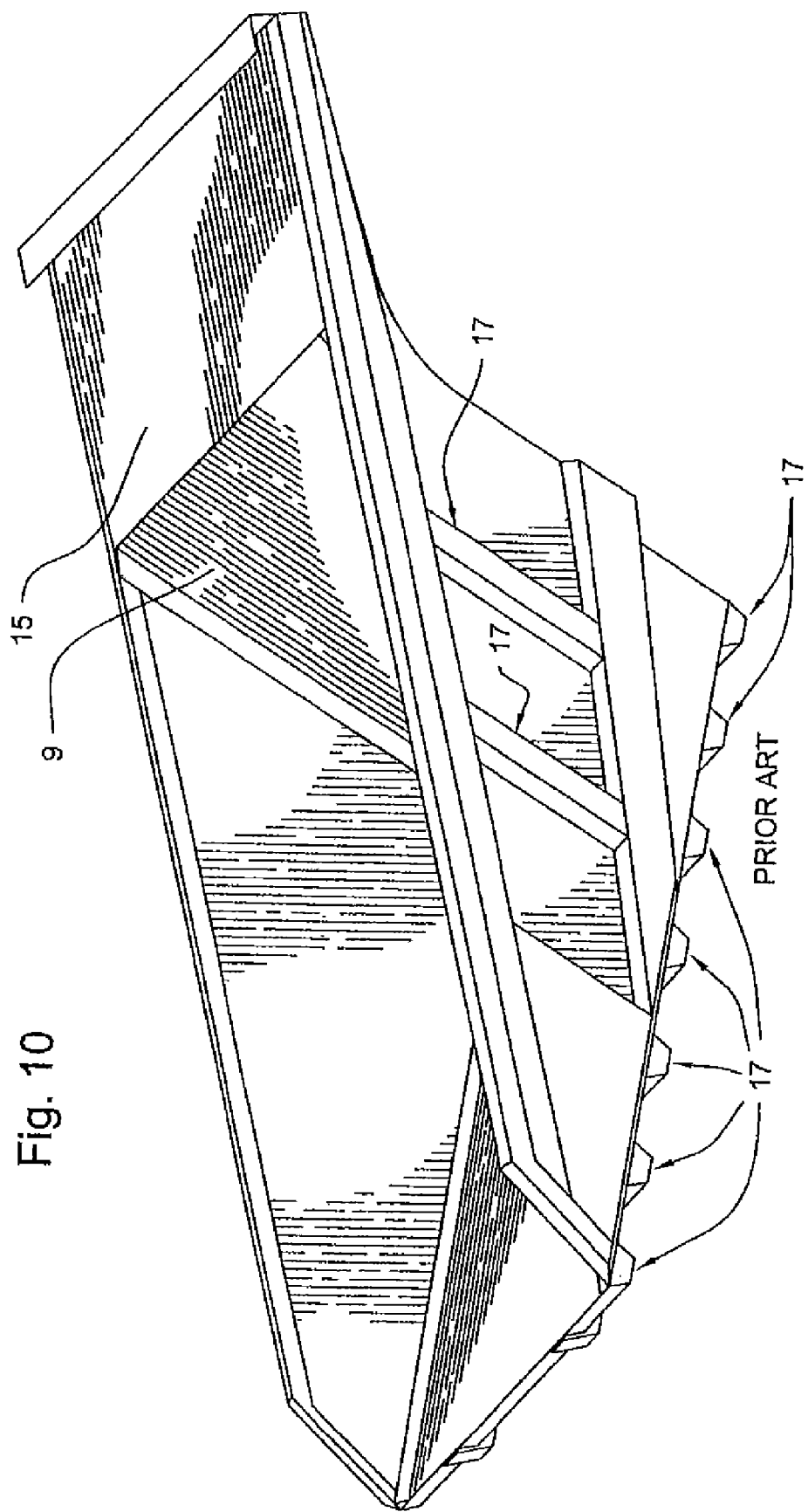
FIG. 10 is a perspective view of a traditional truck body without the forward wedged front wall or side-sloped canopy.

FIG. 10 is a perspective view of a traditional truck body without the forward wedged front wall or side-sloped canopy. The purpose of this figure is to illustrate the prior art. In a traditional truck body, both the front wall 9 and canopy 15 are flat. In addition, the support members are bent ribs 17 (as described in the Background section and shown in greater detail in FIG. 12), not tube-style support members.

Figure 11:
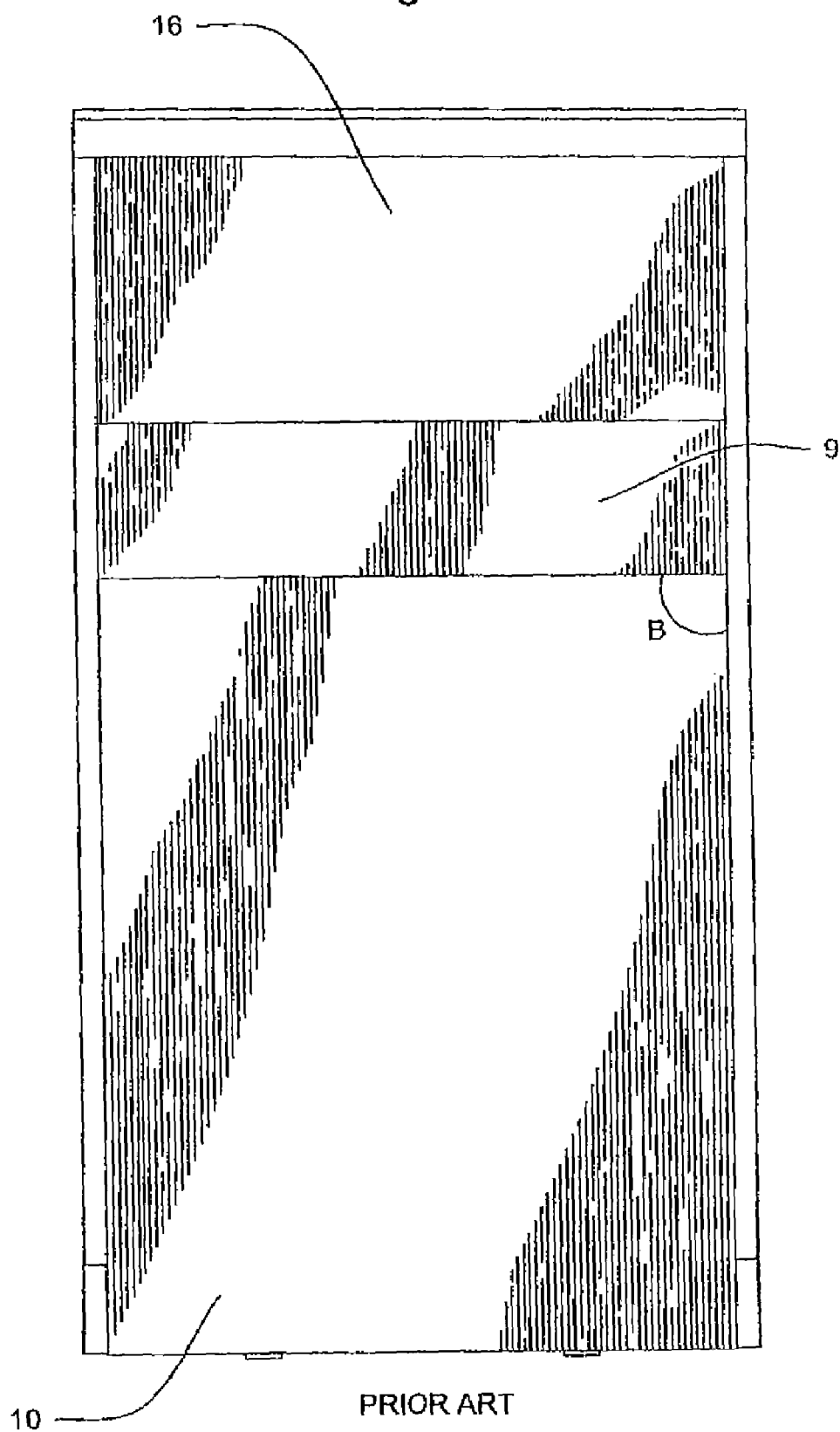
FIG. 11 is a top view of a traditional truck body without the forward wedged front wall or side-sloped canopy.

FIG. 11 is a top view of a traditional truck body without the forward wedged front wall or side-sloped canopy. As shown in this figure, the angle between the line formed by the juncture of the sidewall 6 and floor 10, on the one hand, and the line formed by the juncture of the flat front wall 9 and floor 10, on the other hand (shown in FIG. 7 as angle "B"), is ninety (90) degrees. This ninety (90)-degree angle leads to the material accumulation problems described above.

Figure 12:
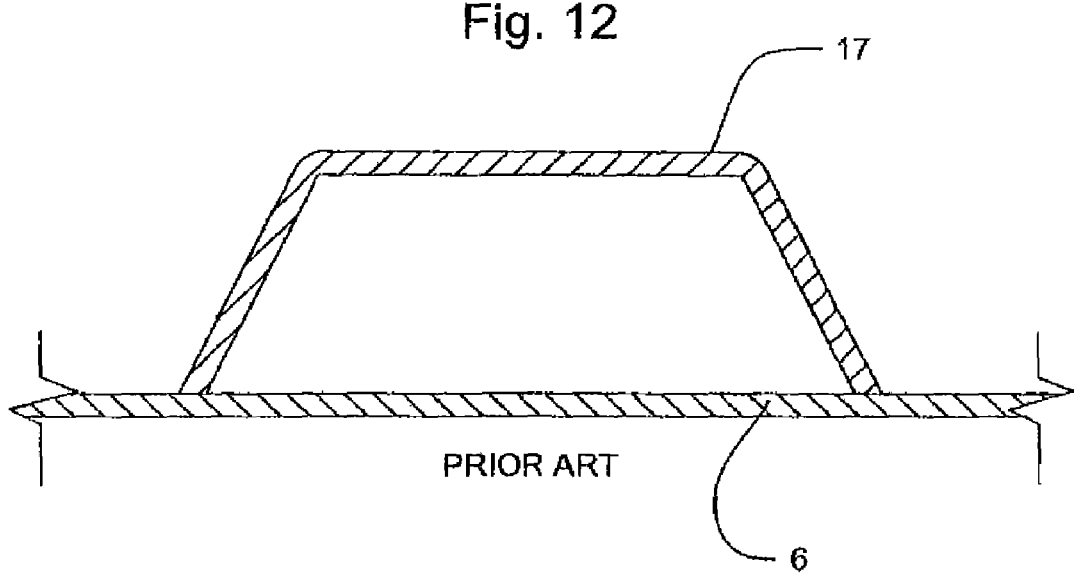
FIG. 12 is a cross-section view of a bent rib of a traditional truck body.

FIG. 12 is a cross-section view of a bent rib of a traditional truck body. This figure illustrates the construction of a typical bent rib 17. As shown in this figure, the bent rib 17 comprises a single piece of steel that is bent to form the rib shape. The bent rib 17 is then welded onto the outside of the sidewall 6, floor, front wall or canopy.

Figure 13:
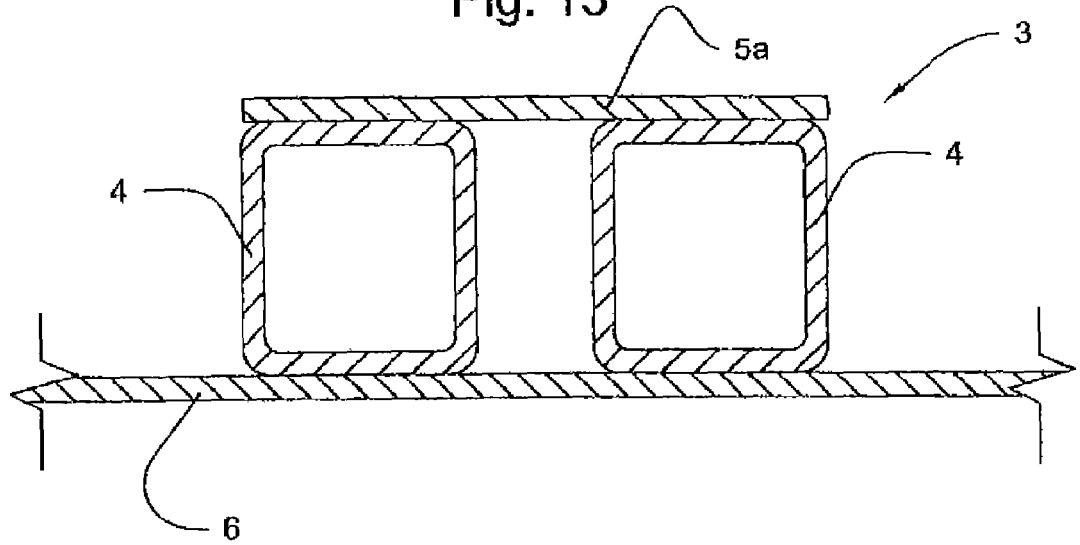
FIG. 13 is a cross-section view of a double-size tube-style support member of the truck body of the present invention.

FIG. 13 is a cross-section view of a double-size tube-style support member of the truck body of the present invention. The tube-style support member 3 shown here comprises two pieces of square tubing 4 welded to a cover plate 5a. The cover plate 5a extends across the top of the two pieces of square tubing 4. There may be a space between the two pieces of square tubing 4, as shown in this figure, or they may be flush up against each other (not shown). The tube-style support member 3 may also comprise a single piece of square tubing 4 (as shown in FIG. 14), in which case no cover plate is necessary.

Figure 14:
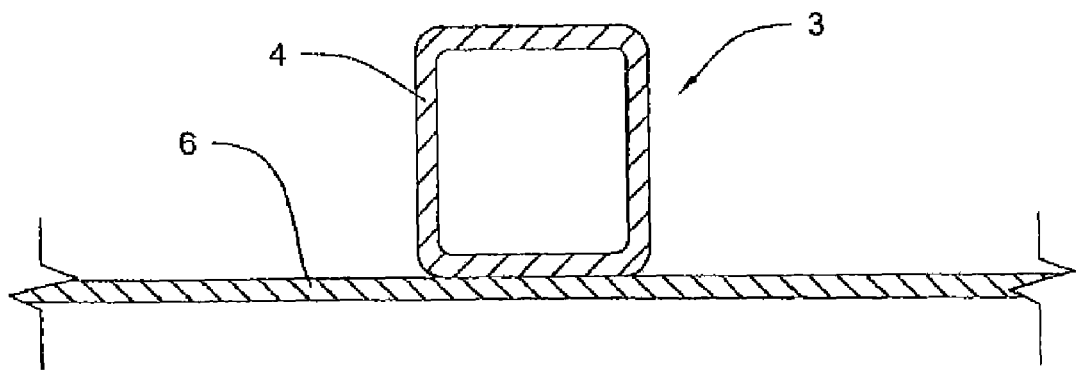
FIG. 14 is a cross-section view of a single-size tube-style support member of the truck body of the present invention.

FIG. 14 is a cross-section view of a single-size tube-style support member. This tube-style support member 3 comprises a single piece of square tubing 4. It is shown here flush up against the sidewall 6. Although FIGS. 13 and 14 show tube-style support members comprised of two and one piece(s) of square tubing, respectively, the present invention is not limited to any particular number of pieces of square tubing in a single tube-style support member. For example, a single tube-style support member could be comprised of three or even four pieces of square tubing, with a cover plate across them.

With the tube-style truck body, the strength and durability of the truck body is greatly improved. One reason for this improvement in performance is because with the tube-style support members, one side of the square tubing 4 is flush against the structure that it is intended to support (e.g., the sidewall, floor, front wall or canopy), thereby providing additional structural integrity to and reducing the stress on the truck body. In addition, the square tubing has superior resistance to bending and twisting because of its box shape versus the open-side shape of the bent rib. The higher yield strength of the tube-style support members as compared to the bent ribs has been proven through finite element analysis tests run on truck bodies with both types of structures.

Other advantages of the tube-style truck body include the fact that the tube-style support members may potentially weigh less than the bent ribs of a traditional truck body. The reason the tube-style support members may be lighter than the bent ribs is because a common way to improve the strength of a bent rib is to increase the thickness of the steel plate that is used to create the rib. With a tube-style support member, due to its square shape, the steel does not have to be as thick to provide the same degree of strength. The thickness of the square tubing is selected based on the anticipated life of the truck body and the load that it will incur during that life.

Another advantage of the tube-style truck body is that it is easier to manufacture and provides a better weld site than the traditional bent ribs. The tube-style truck body is easier to manufacture because the square tubing is commercially available and does not require any changes other than in length. The square tubing does not have to be formed and bent, which greatly reduces manufacturing time and labor costs. The tube-style truck body provides a better weld site than a bent rib because it intersects the outside of the truck box at a ninety (90)-degree angle and because the corners of the square tubing are rounded, which naturally produces a weld land between the flat plate and the tubing.

Furthermore, the time associated with the manufacturing process is reduced with the tube-style support members because all of the pieces are consistent in size and shape, which is not necessarily the case with the bent ribs. Because the bent ribs are formed on a press brake, the angles may change slightly from one bent rib to another. These slight differences in size require more labor during the process of fitting the components together.

Figure 15:
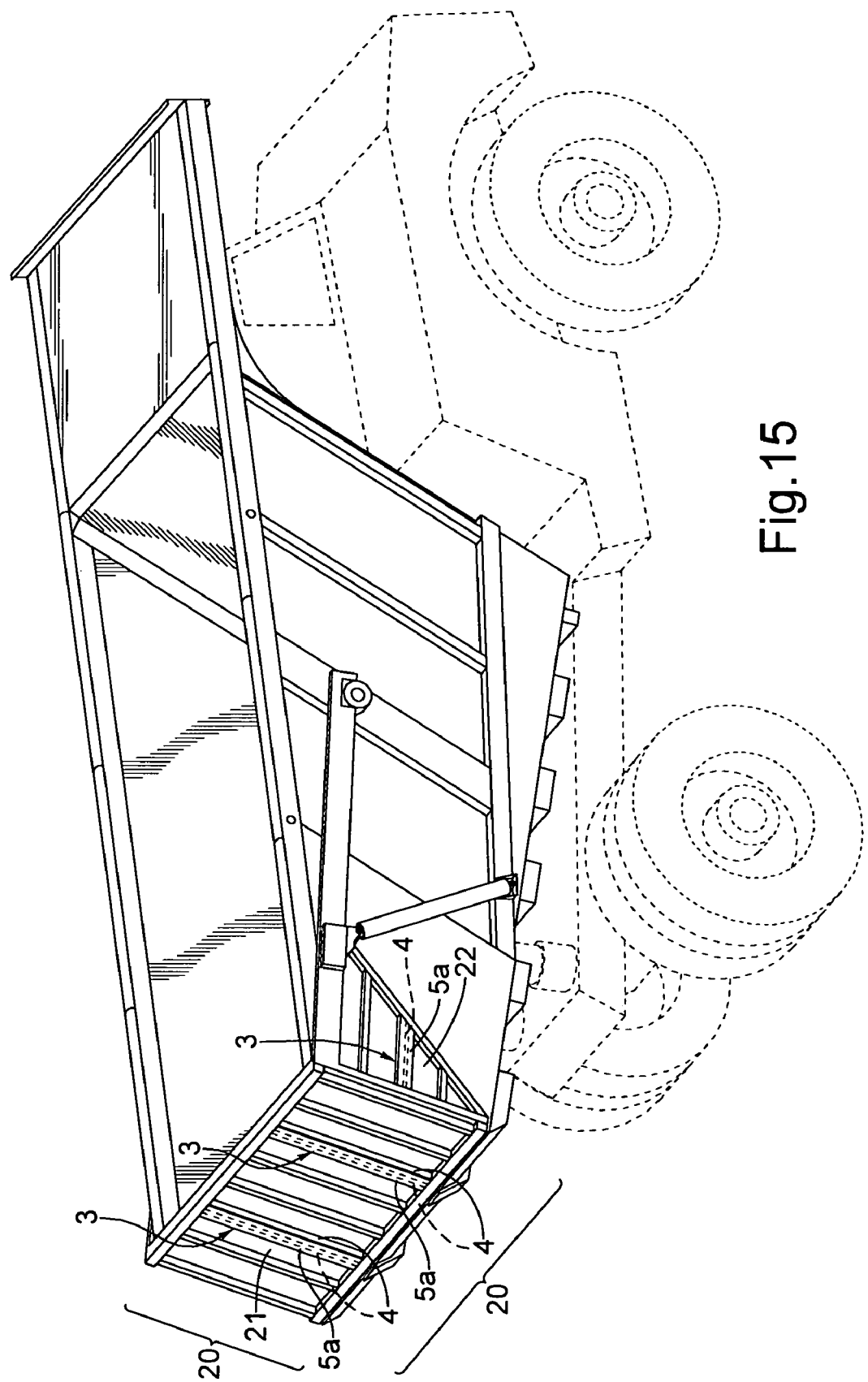
FIG. 15 is a perspective view of the truck body of the present invention installed on a chassis with a tube-style tailgate.

FIG. 15 is a perspective view of the truck body of the present invention installed on a chassis with a tube-style tailgate. In this figure, the tailgate 20 is comprised of tube-style support members 3, which in turn are comprised of square tubing 4, as described above in connection with the rest of the truck body. The tube-style support members 3 are used on the rear panel 21 of the tailgate, as well as on the side panels 22, in lieu of the traditional bent ribs shown in FIG. 12. Single-size tube-style support members or double-size tube-style support members, or a combination of each, can be used. The tailgate may be used with a tube-style truck body or with a conventional truck body.

Figure 16:
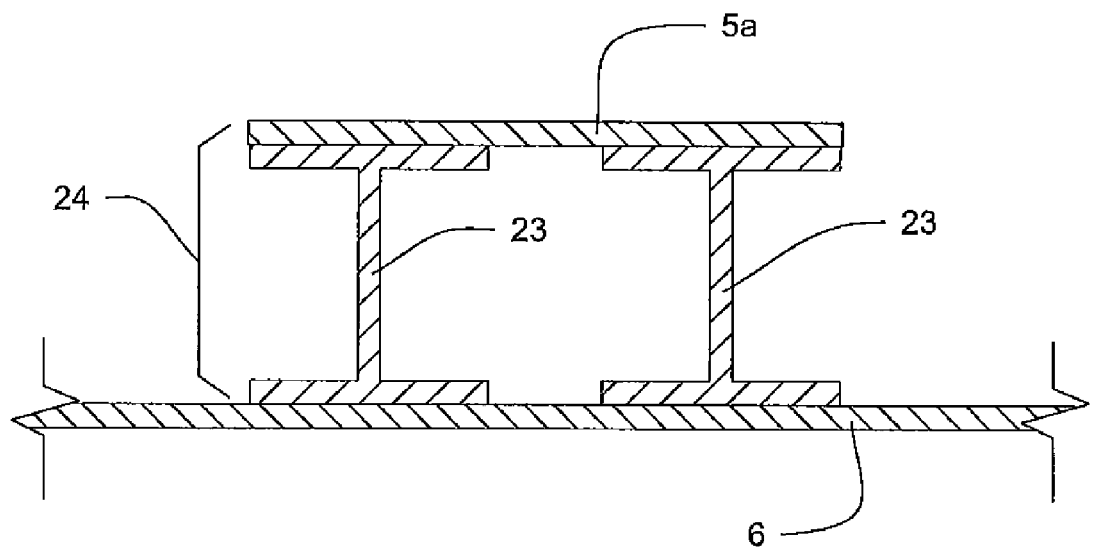
FIG. 16 is a cross-section view of a double-size I-beam-style support member of an alternate embodiment of the truck body of the present invention.
Figure 17:
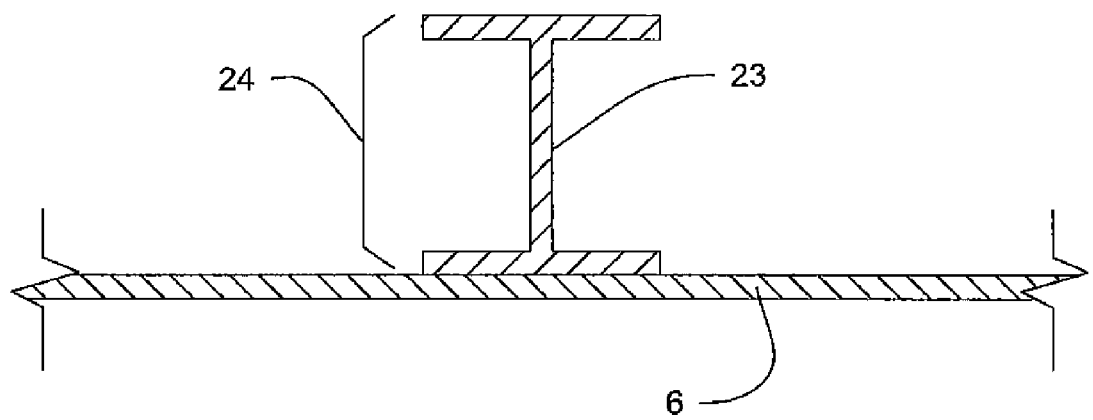
FIG. 17 is a cross-section view of a single-size I-beam-style support member of an alternate embodiment of the truck body of the present invention.

In an alternate embodiment of the present invention, steel I-beams are used in lieu of the square steel tubing. FIGS. 16 and 17 illustrate this embodiment. As shown in these figures, steel I-beams 23 may be used instead of the square steel tubing 4 shown in FIGS. 13 and 14. In this embodiment, each I-beam-style support member 24 comprises one or more I-beams 23. The double-size I-beam-style support member also includes a cover plate 5a. A difference between this embodiment and the tube-style embodiment described above is that the sides of the I-beam-style support members 24 are open, whereas the sides of the tube-style support members are closed. In addition, the I-beam-style support members have extra support through the middle of each I-beam, whereas the tube-style support members have extra support along the sides of each tube, as shown in FIGS. 13-14 and 16-17. The I-beam-style embodiment offers many of the same advantages as described above for the tube-style embodiment.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A tailgate comprising a rear panel and two side panels,
    wherein the rear and side panels each comprises a flat sheet of metal,
    wherein each flat sheet of metal comprises an inner face and an outer face,
    wherein the rear and side panels each comprises one or more support members,
    wherein the support member comprises two pieces of square tubing aligned so that they are parallel to one another,
    wherein each piece of square tubing comprises an inner side and an outer side,
    wherein the inner side of each piece of square tubing is welded to the outer face of the flat sheet of metal that comprises the rear panel or one of the two side panels,
    wherein a cover plate is welded to the outer side of two pieces of square tubing, and
    wherein the square tubing is comprised of steel.

2. The tailgate of claim 1, wherein the support members that are welded to the rear panel are oriented vertically, and wherein the support members that are welded to the side panels are oriented horizontally.

* * * * *

UNITED STATES PATENT AND TRADEMARK OFFICE
CERTIFICATE OF CORRECTION

| | | |
|---|---|---|
| PATENT NO. | : 7,481,483 B2 | |
| APPLICATION NO. | : 11/277941 | |
| DATED | : January 27, 2009 | |
| INVENTOR(S) | : John A. D'Amico and Dennis A. Frank | |

It is certified that error appears in the above-identified patent and that said Letters Patent is hereby corrected as shown below:

Title Pg, Item (73) Assignee: Delete "NY" and insert --(WY)--.

Signed and Sealed this

Nineteenth Day of May, 2009

JOHN DOLL
*Acting Director of the United States Patent and Trademark Office*